United States Patent
Yamaguchi (10) Patent No.: US 8,383,535 B2
(45) Date of Patent: *Feb. 26, 2013

(54) LAMINATED CERAMIC CAPACITOR

(75) Inventor: Katsuyoshi Yamaguchi, Kirishima (JP)

(73) Assignee: Kyocera Corporation, Kyoto (JP)

( * ) Notice: Subject to any disclaimer, the term of this patent is extended or adjusted under 35 U.S.C. 154(b) by 180 days.

This patent is subject to a terminal disclaimer.

(21) Appl. No.: 12/989,406

(22) PCT Filed: Apr. 24, 2009

(86) PCT No.: PCT/JP2009/058194
§ 371 (c)(1),
(2), (4) Date: Dec. 1, 2010

(87) PCT Pub. No.: WO2009/131221
PCT Pub. Date: Oct. 29, 2009

(65) Prior Publication Data
US 2011/0075321 A1 Mar. 31, 2011

(30) Foreign Application Priority Data
Apr. 24, 2008 (JP) ................. 2008-113493
Jun. 5, 2008 (JP) ................. 2008-148512

(51) Int. Cl.
*H01G 4/018* (2006.01)
*C04B 35/468* (2006.01)

(52) U.S. Cl. .................. 501/138; 501/139; 361/321.4

(58) Field of Classification Search .............. 361/321.4; 501/137, 138, 139
See application file for complete search history.

(56) References Cited

U.S. PATENT DOCUMENTS

| | | | | |
|---|---|---|---|---|
| 6,245,433 B1* | 6/2001 | Nakamura et al. | ............ | 428/469 |
| 7,439,203 B2* | 10/2008 | Ito et al. | ................ | 501/139 |
| 7,759,269 B2* | 7/2010 | Takahashi et al. | ............ | 501/138 |
| 7,968,486 B2* | 6/2011 | Yamaguchi | .............. | 501/139 |
| 2007/0253145 A1* | 11/2007 | Kurozumi et al. | ......... | 361/321.4 |
| 2009/0284899 A1* | 11/2009 | Yamaguchi | ............... | 361/321.4 |

* cited by examiner

*Primary Examiner* — Karl Group
(74) *Attorney, Agent, or Firm* — Birch Stewart Kolasch Birch, LLP (57) ABSTRACT

A laminated ceramic capacitor includes a capacitor body of alternately stacked dielectric layers and internal electrode layers, and an external electrode provided on the end face of the capacitor body on which the internal electrode layer is exposed. The dielectric layer has a crystal phase composed mainly of barium titanate and having a cubic system crystal structure. The grain diameter of crystal grains constituting the crystal phase is 0.05 to 0.2 pm. The dielectric layer is formed of a ceramic containing, per mole of barium, 0.0014 to 0.03 moles yttrium, 0.0002 to 0.045 moles manganese, 0.0075 to 0.04 moles magnesium and 0.025 to 0.18 moles ytterbium. The dielectric bonding material is formed of a ceramic containing the same components as those of the main crystal phase of the dielectric ceramic constituting the dielectric layer.

2 Claims, 3 Drawing Sheets

LAMINATED CERAMIC CAPACITOR

This application is the National Stage filing of International application No. PCT/JP2009/058194 filed on Apr. 24, 2009, which claims priority under 35 U.S.C. §119 to Japanese application No. 2008-113493 filed on Apr. 24, 2008 and Japanese application No. 2008-148512 filed on Jun. 5, 2008.

TECHNICAL FIELD

This present invention relates to dielectric ceramic capacitors constituted by crystal grains containing barium titanate as a main component and having a low electrostrictive strain.

BACKGROUND ART

Recently, digital electronic devices such as mobile computers and cellular phones are now widely used. Nationwide digital terrestrial broadcasting will start in near future. Receivers for digital terrestrial broadcasting are digital electronic devices such as a liquid crystal display (LCD) and a plasma display. Such digital electronic devices include many large scale integrated circuits (LSI's).

Power circuits constituting digital electronic devices such as a liquid crystal display (LCD) and a plasma display include many capacitors for bypassing. A multilayer ceramic capacitor used for those devices having a high relative dielectric constant (for example, see the Patent Document 1) is used if a high capacitance is required. On the other hand, a temperature-compensating type multilayer ceramic capacitor having a low change rate of capacitance (for example, see the Patent Document 2) is used if a temperature characteristic of a capacitance is important even though the dielectric constant is low.

A multilayer ceramic capacitor having a high relative dielectric constant disclosed in the Patent Document 1, however, is constituted by containing dielectric crystals in a dielectric ceramic which has a ferroelectric property. Therefore, in the multilayer ceramic capacitor, a temperature change rate of the relative dielectric constant of dielectric ceramics is high, and hysteresis indicating dielectric polarization is high. Consequently, audible noise sounds tend to be easily generated on a power supply circuit due to an electrically induced strain. This is an obstacle for using such capacitors in plasma displays and the like.

On the other hand, in a temperature-compensating type multilayer ceramic capacitor, the dielectric layer constituting the capacitor has a paraelectric property. Therefore, the hysteresis indicating dielectric polarization does not appear. Thereby, the temperature-compensating type multilayer ceramic capacitor is advantageously free from the electrically induced strain inherent to the ferroelectric property. However, since the temperature-compensating type multilayer ceramic capacitor has a low relative dielectric constant, its accumulating capability is low and performances as a bypass capacitor are unsatisfied. It is a problem.

In addition, a multilayer ceramic capacitor used as a passive component is generally attached on a substrate constituting the above-described power circuit and the like by a soldering method using a reflow process. In this case, mechanical damage such as a crack or delamination may occur on a main body of the multilayer ceramic capacitor due to thermal stress caused by molten solder. Therefore, there is a need for a multilayer ceramic capacitor that has a high relative dielectric constant that is stable over temperature (has a stable temperature characteristic). Therefore, the multilayer ceramic capacitors are required to withstand a rapid heating or a rapid cooling in a soldering process and have an sufficient thermal shock resistance for preventing delamination or cracks.

[Patent Document 1] Japanese Unexamined Patent Application Publication No. 2001-89231
[Patent Document 2] Japanese Unexamined Patent Application Publication No. 2001-294481

DISCLOSURE OF INVENTION

Problems to be Solved by the Invention

Accordingly, an object of the present invention is to provide a multilayer ceramic capacitor which has a high relative dielectric constant, stable temperature characteristics of relative dielectric constant, a low dielectric polarization and high thermal shock resistance.

Means for Solving the Problem

A multilayer ceramic capacitor according to the present invention comprises: a capacitor body in which dielectric layers and internal electrode layers are alternately layered; and an external electrode formed on an end surface of the capacitor body where the internal electrodes are exposed. Two dielectric layers of the dielectric layers sandwiching one of the internal electrode layers and disposed on both side of the internal electrode layer is formed together with a dielectric bonding member which is arranged such that the dielectric bonding member penetrates part of the internal electrode layer. The dielectric layers are made of a dielectric ceramic which comprises a main crystal phase containing barium titanate as a main crystal component, having a crystal structure mainly comprising a cubic system, having an average grain size of crystal grains constituting the crystal phase in a range of 0.05 to 0.2 μm, and made of a dielectric ceramic comprising ytterium, manganese, magnesium and ytterbium. The dielectric bonding member is made of a dielectric ceramic which contain the same component as the main crystal phase of the dielectric ceramic constituting the dielectric layers. Furthermore, with respect to one mole of barium, elements calculated by melting and dissolving the multilayer ceramic capacitor in acid are:

yttrium equivalent to 0.0014 to 0.03 mole of $YO_{3/2}$;
manganese equivalent to 0.0002 to 0.045 mole of MnO;
magnesium equivalent to 0.0075 to 0.04 mole of MgO; and
ytterbium equivalent to 0.025 to 0.18 mole of $YbO_{3/2}$.

In the multilayer ceramic capacitor according to the present invention, with respect to one mole of barium, preferable contents of elements calculated by melting and dissolving the multilayer ceramic capacitor in acid are as follows: yttrium is equivalent to 0.005 to 0.024 mole of $YO_{3/2}$; manganese is equivalent to 0.02 to 0.04 mole of MnO; magnesium is equivalent to 0.017 to 0.03 mole of MgO; and ytterbium is equivalent to 0.06 to 0.14 mole of $YbO_{3/2}$. Also, the preferable average grain size of the crystal grains is in a range of 0.07 μm to 0.15 μm.

Effects of the Invention

According to the present invention, a multilayer ceramic capacitor, which has a high relative dielectric constant compared to existing dielectric ceramics having a paraelectric property, stable temperature characteristics of relative dielectric constant, a low dielectric polarization and high thermal shock resistance, can be obtained.

REFERENCE NUMERALS 1 capacitor body
3 external electrode
5 dielectric layer
7 internal electrode layer
8 dielectric bonding member

BEST MODE FOR CARRYING OUT THE INVENTION

Figure 1:
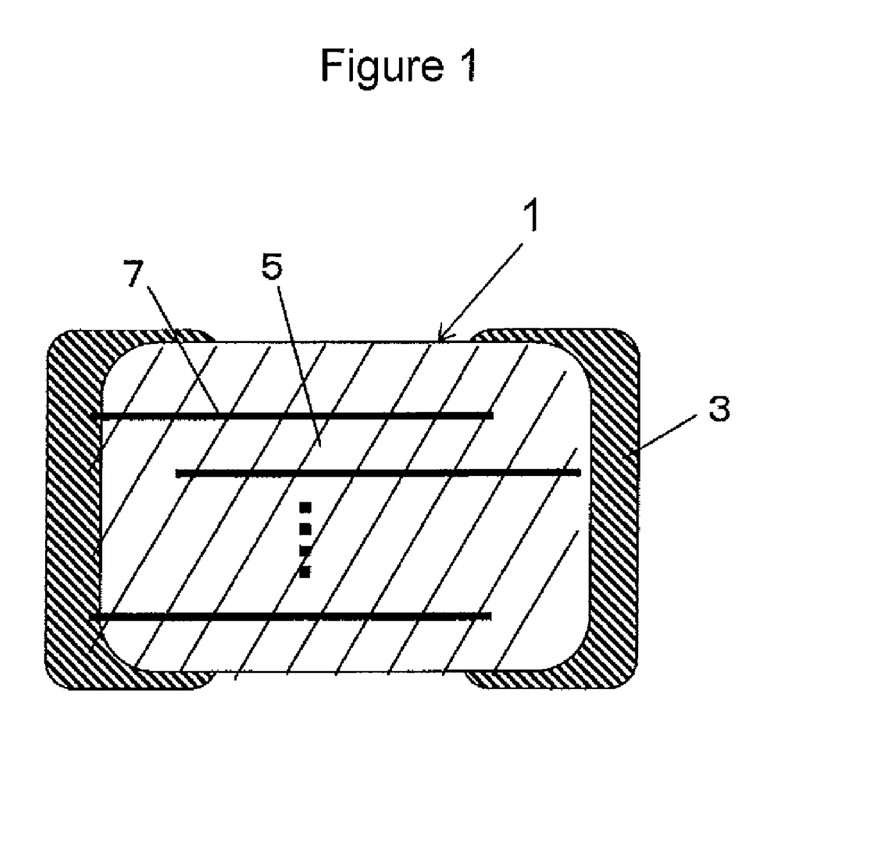
FIG. 1 is a schematic cross-sectional view illustrating an exemplary multilayer ceramic capacitor according to the invention.
Figure 2:
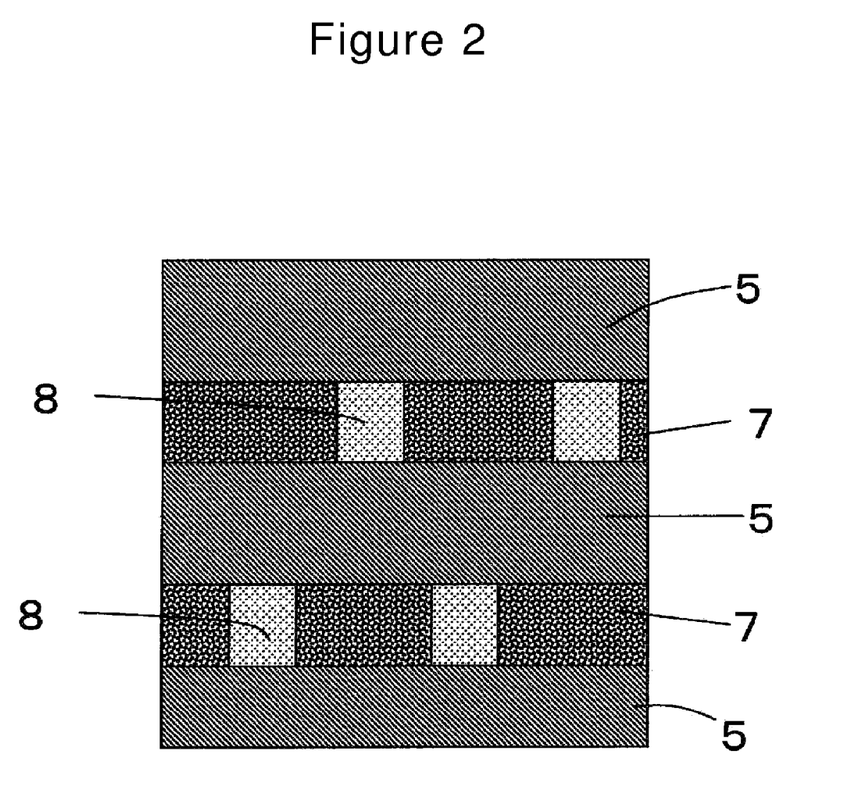
FIG. 2 is an enlarged view of an inside of the multilayer ceramic capacitor shown in FIG. 1.

A multilayer ceramic capacitor according to the present invention is described with reference to the schematic cross-sectional view shown in FIG. 1. FIG. 1 is a schematic cross-sectional view illustrating an exemplary multilayer ceramic capacitor according to the present invention. FIG. 2 is an enlarged view of an inside of the multilayer ceramic capacitor shown in FIG. 1.

In the multilayer ceramic capacitor according to the present invention, external electrodes are formed on both end portion of a capacitor body 1. The external electrodes are formed by baking Cu or Ni—Cu alloy paste, fore example.

In the capacitor body 1, dielectric layers 5 and internal electrode layers 7 are alternately laminated to configure a dielectric ceramic. In FIG. 1, the state of lamination of the dielectric layers 5 and the internal electrode layers 7 is simplified for illustration. However, in the following embodiments, the multilayer ceramic capacitor is configured by a laminated body with hundreds of layers of the dielectric layers 5 and the internal electrode layers 7.

Each of the dielectric layers 5 made of dielectric ceramic consists of crystal grains and a grain boundary phase and has a thickness of 10 μm or less, specifically, preferably 5 μm or less, thereby making it possible to reduce a size of the multilayer ceramic capacitor and increase the capacitance. Note that if the thickness of the dielectric layer is 2 μm or more, the variation of the capacitance can be reduced and the temperature characteristic of capacitance can be stabilized. In the multilayer ceramic capacitors in the embodiments, a pair of dielectric layers 5 sandwiching an internal electrode layer 7 and arranged at both sides of the internal electrode layer 7 is formed together with a dielectric bonding member which is arranged such that the dielectric bonding member penetrates part of the internal electrode layer.

The internal electrode layers 7 are preferable to be base metals such as nickel (Ni) and cupper (Cu) because a large number of the layers can be laminated at a reduced manufacturing cost. In particular, nickel (Ni) is preferable since the internal electrode layers 7 and the dielectric layers 5 can be co-fired according to the present embodiment.

In a multilayer ceramic capacitor according to the present embodiment, the dielectric layers 5 is made of a dielectric ceramic which comprises a main crystal phase: containing barium titanate as a main component; having a crystal structure mainly comprising a cubic system; and further containing yttrium, manganese, magnesium and ytterbium. Crystal grains constituting the crystal phase have an average grain size of 0.05 to 0.2 μm.

The dielectric bonding member 8 is made of a dielectric ceramic containing the same component as the main crystal phase in the dielectric ceramic constituting the dielectric layers.

The composition measured by melting and dissolving the multilayer ceramic capacitor in hydrochloric acid is that, with respect to one mole of barium, the yttrium is equivalent to 0.0014 to 0.03 mole of $Y_2O_3$, the manganese is equivalent to 0.0002 to 0.045 mole of MnO, the magnesium is equivalent to 0.0075 to 0.04 mole of MgO and the ytterbium is equivalent to 0.025 to 0.18 mole of $Yb_2O_3$.

The dielectric ceramic 5 having the above-mentioned compositions, grain sizes and a crystal structure mainly comprising cubic system and a dielectric bonding member 8 that is arranged such that dielectric ceramics 5, which sandwich an internal electrode layer 7 and are arranged on both side of the internal electrode layer 7, penetrate part of the internal electrode layer 7, is made a dielectric ceramic containing the same component as the main crystal phase in the dielectric ceramic constituting the dielectric layers as described above. As a result, the dielectric layer constituting a multilayer ceramic capacitor can have a relative dielectric constant at room temperature (25° C.) of 700 or more, a relative dielectric constant at 125° C. of 650 or more as well as a temperature coefficient (($\in$125-$\in$25)/$\in$25(125-25)) of relative dielectric constant in a temperature range of 25° C. to 125° C. of $1000\times10^{-6}$/° C. or less in its absolute value, and the polarization charges (values of residual polarization at 0V of voltage) at a room temperature are larger than 25 $nC/cm^2$. Such a dielectric ceramic can also have neither delamination nor a crack in a thermal shock test, thereby providing a highly reliable multilayer ceramic capacitor.

That is, in the multilayer ceramic capacitor according to the present embodiment, the dielectric layers 5 are constituted by a crystal phase made of mainly a cubic system which has solid solution of yttrium, manganese, magnesium and ytterbium with barium titanate. In addition, crystal grains constituting the crystal phase has an average grain size in a certain range and the dielectric bonding member 8, which penetrates part of the internal electrode layer 7 and is formed together with the dielectric layers 5, has the same component as the main crystal phase in the dielectric ceramic constituting the dielectric layers.

In other words, if the yttrium, the manganese and the magnesium are contained in barium titanate in a certain range, the dielectric ceramic can have a Curie temperature of a room temperature (25° C.) or more and have a positive value in the temperature coefficient of relative dielectric constant. In addition, if the ytterbium is further added the dielectric ceramic having such a dielectric property, the temperature coefficient of relative dielectric constant can be smaller and the temperature characteristic can be further flattened. In this case, the hysteresis of dielectric polarization can become small.

In addition, by forming the dielectric bonding member 8 which penetrates part of the internal electrode layer 7 and includes the same component as the main crystal phase in the dielectric ceramic constituting the dielectric layers 5, the multilayer ceramic capacitor having the above described dielectric properties.

Additionally, in the multilayer ceramic capacitors in the embodiments, two dielectric layers of the dielectric layers 5 sandwiching one of the internal electrode layer 7 and arranged on both side of the internal electrode layer 7 is formed together with a dielectric bonding member 8 which is arranged such that the dielectric bonding member 8 penetrates part of the internal electrode layer 7, and the dielectric bonding member 8 is made of a dielectric ceramic which includes the same component as the main crystal phase in the dielectric ceramic constituting the dielectric layers 5.

Accordingly, since the adhesion between the dielectric layer 5 constituting the multilayer ceramic capacitor and the internal electrode layer 7 are high, delamination or a crack is prevented from occurring in a thermal shock resistance test even for a large size multilayer ceramic capacitor having a size of 3 mm×1.5 mm×1.5 mm or more.

Since the dielectric bonding member 8 is constituted by a dielectric ceramic which includes the same component as the main crystal phase in the dielectric ceramic constituting the dielectric layers 5, in addition to high dielectric constant, a stable temperature characteristic of a relative dielectric constant and a small dielectric polarization are achieved.

Note that the temperature characteristic of the relative dielectric constant can be obtained from the equation of $(\in125-\in25)/\in25(125-25)$ with a measurement result of capacitance in a temperature range of 25 to 125° C.

Figure 3:
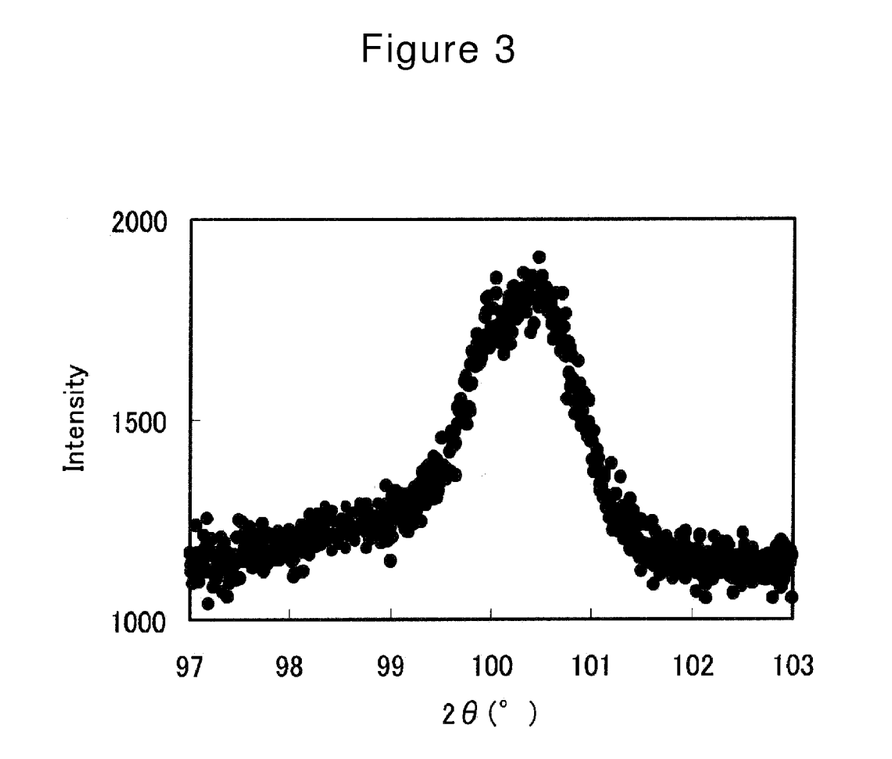
FIG. 3 is a graph showing a powder X-ray diffraction pattern of the dielectric layer of a specimen (Sample No. 4) indicating exemplary multilayer ceramic capacitor.

Here, "comprising a main crystal phase containing barium titanate as a main component and the crystal phase has a crystal structure mainly comprising a cubic system" refers that barium titanate is a main component, yttrium, manganese, magnesium and ytterbium or other additives are contained, as a crystal structure identified by X-ray diffraction is for example, as shown in FIG. 3, a peak is found in a range of $\theta=97$ to 104° (plane index (400)), and the peak of plane index (400) of perovskite-type crystal structure is not separated in a degree as seen in FIG. 3. A crystal phase having a crystal structure other than the cubic system may be included in a small amount.

In addition, the thermal shock resistance test refers a test in which mechanical damage of specimens, which are exposed to an environment having a high temperature in a short period of time, is evaluated.

In a multilayer ceramic capacitor according to the present embodiments, a composition of a ceramic component including the dielectric layers 5 and the dielectric bonding member 8 is in a certain range. That is, the contents, which are measured by melting and dissolving the multilayer ceramic capacitor in hydrochloric acid, of elements, are as follows with respect to one mole of barium: the yttrium is equivalent to 0.0014 to 0.03 mole of $Y_2O_3$; the manganese is equivalent to 0.0002 to 0.045 mole of MnO; the magnesium is equivalent to 0.0075 to 0.04 mole of MgO; and the ytterbium is equivalent to 0.025 to 0.18 mole of $Yb_2O_3$.

In this case, acid for melting and dissolving the multilayer ceramic capacitor is any acid to be able to melt and dissolve the dielectric ceramic, and preferred are hydrochloric acid, nitric acid, sulfuric acid, hydrochloric acid solution including boric acid and sodium carbonate, and the like.

The ytterbium serves for preventing the crystals of the dielectric ceramic from having significant grain growth. A content of the ytterbium is equivalent to 0.025 to 0.18 mole of $YbO_{3/2}$ with respect to 1 mole of barium.

If a content of the Yb is equivalent to less than 0.025 mole of $YbO_{3/2}$ with respect to 1 mole of barium, although a relative dielectric constant of the dielectric layers 5 calculated form capacitance of the multilayer ceramic capacitor is high, a temperature coefficient of relative dielectric constant is also larger than $1000\times10^{-6}/°$ C., and the dielectric layers 5 has a hysteresis in the dielectric polarization. In contrast, if a content of the Yb is equivalent to more than 0.18 mole of $YbO_{3/2}$ with respect to 1 mole of barium, the relative dielectric constant of the multilayer ceramic capacitance at 25° C. is less than 700 and the relative dielectric constant at 125° C. is less than 650.

A content of the magnesium is equivalent to 0.0075 to 0.04 mole of MgO with respect to 1 mole of barium. If the content of the magnesium is equivalent to less than 0.0075 mole of MgO, a temperature coefficient of relative dielectric constant is also larger than $1000\times10^{-6}/°$ C., and polarization charges are larger than 25 $nC/cm^2$. In contrast, if a content of the magnesium is equivalent to more than 0.18 mole of MgO with respect to 1 mole of barium, the relative dielectric constant of the multilayer ceramic capacitance is less than 700 and the polarization charges (values of residual polarization at 0V of voltage) are larger than 25 $nC/cm^2$.

A content of the yttrium is equivalent to 0.0014 to 0.03 mole of $YO_{3/2}$ with respect to 1 mole of barium and a content of the manganese is equivalent to 0.0002 to 0.045 mole of MnO with respect to 1 mole of barium.

If the content of the yttrium is equivalent to less than 0.0014 mole of $YbO_{3/2}$ with respect to 1 mole of barium, or if the content of the manganese is equivalent to less than 0.0002 mole of MnO with respect to 1 mole of barium, a temperature coefficient of relative dielectric constant of the dielectric layers 5 calculated form capacitance of the multilayer ceramic capacitor is larger than $1000\times10^{-6}/°$ C., and the polarization charges are larger than 25 $nC/cm^2$. If the content of the manganese is equivalent to more than 0.045 mole of MnO with respect to 1 mole of barium, the relative dielectric constant of the dielectric layers 5 calculated form capacitance of the multilayer ceramic capacitor is less than 700 and the temperature coefficient of relative dielectric constant is larger than $1000\times10^{-6}/°$ C.

In the multilayer ceramic capacitor according to this embodiment, a glass component or other components may be added as an auxiliary for enhancing the sintering property into the dielectric ceramic with a composition of 4% or less by mass as long as desired dielectric characteristics can be maintained.

In the multilayer ceramic capacitor according to this embodiment, an average grain size of crystal grains constituting the crystal phase containing barium titanate as a main component is in a range between 0.05 and 0.2 μm. That is, by setting the average grain size of crystal grains constituting the crystal phase containing barium titanate as a main component to a range between 0.05 and 0.2 μm, the hysteresis of dielectric polarization can become small and the multilayer ceramic capacitor can show a property closer to a paraelectric property.

In contrast, if the average grain size of crystal grains is less than 0.05 μm, the contribution of an orientation polarization is none, and therefore, a relative dielectric constant of the dielectric layers 5 calculated form capacitance of the multilayer ceramic capacitor is reduced. If the average grain size of crystal grains is greater than 0.2 μm, the temperature coefficient of relative dielectric constant of the dielectric layers 5 is increased, the dielectric polarization is increased, or the dielectric polarization is increased as well as the temperature coefficient of relative dielectric constant of the dielectric layers 5 is increased.

The average grain size of crystal grains constituting the crystal phase can be determined by the following processes: a cross-sectional fracture surface of a sample made of the fired capacitor body 1 is polished; photograph of an internal microstructure of the polished sample is taken with using a scanning electron microscope; a circle which includes 50 to 100 particles therein was drawn on the photograph; the crystal grains on or within the circle were picked up; then, profiles of the grains on the photograph are subject to an image processing to measure an area of each grains; a diameter of each grain is calculated with an assumption that each grain has a shape of circle with the same area and an average value thereof is calculated.

Components of the dielectric bonding member 8 is analyzed by a transmission electron microscope equipped with an elemental analysis device. First, a cross section of the capacitor body 1 constituting the multilayer ceramic capacitor is polished obliquely or perpendicularly. Then, the dielectric bonding member 8 which penetrates the internal electrode layer 7 on the polished surface is subject to an element analysis by irradiating an electron beam thereto. In this case, the spot size of electron beams was 3 nm. The point for analysis is a center area of the dielectric bonding member 8 which penetrates the internal electrode layer 7. The analysis is conducted at ten dielectric bonding members 8 which penetrate the internal electrode layer 7. Elements are detected from each point. Note that an element found in the measured data is recognized as "included in the dielectric bonding member 8" if the element is 0.2% or more with respect to total amounts of all measured elements, while the element is recognized as "not included" if the element is less than 0.2%.

In the present invention, the preferable composition of yttrium, manganese, magnesium is as follows: the yttrium equivalent to 0.005 to 0.24 mole of $YO_{3/2}$, the manganese equivalent to 0.02 to 0.04 mole of MnO, the magnesium equivalent to 0.017 to 0.03 mole of MgO, and the ytterbium equivalent to 0.06 to 0.14 mole of $YbO_{3/2}$ with respect to 1 mole of barium. The average grain size of crystal grains is in a range between 0.07 and 0.15 μm. In the multilayer ceramic capacitor comprising the dielectric layers 5 which has such a composition and an average grain size of crystal grains, a thermal shock resistance is high, the relative dielectric constant at 25° C. is 750 or more, the relative dielectric constant at 125° C. is 710 or more, the temperature coefficient of relative dielectric constant in a temperature range from 25° C. to 125° C. is $850 \times 10^{-6}$/° C. or less as the absolute value, and polarization charges are 20 $nC/cm^2$ or less.

Next, a method for producing a multilayer ceramic capacitor according to the present invention is described. First, ceramic slurry is prepared by mixing a dielectric powder, an organic resin such as a polyvinyl butyral resin, and solvents such as toluene and alcohol with a ball mill and the like. Then, ceramic green sheets are formed on a substrate with the ceramic slurry by a sheet forming method such as a doctor blade method, a die coater method or the like. The ceramic green sheets preferably have a thickness of 1 to 20 μm so that the thickness of the dielectric layers is reduced to provide high capacitance and a high insulation property is maintained.

The dielectric powder used for producing a multilayer ceramic capacitor according to the present embodiment is formed by adding some additives to a calcined powder which has a solid solution of various additives in barium titanate obtained by calsining barium titanate described below that is a main component together with a certain additives.

The raw material powders for forming the dielectric powder are a $BaCO_3$ powder, a $TiO_2$ powder, an $Y_2O_3$ powder and manganese carbonate powder each of which has a purity of 99% or more. The raw material powder is obtained by mixing these powders in a ratio of 0.97 to 0.99 mole of $TiO_2$ powder, 0.0014 to 0.03 mole of $YO_{3/2}$ for $Y_2O_3$ and 0.0002 to 0.045 mole of $MnCO_3$, with respect to one mole of barium which constitutes barium titanate.

The above raw material powders are wet blended and dried followed by subjecting calcination at a temperature of 850 to 1100° C. The resultant powder is pulverized. In this case, the preferable calcined powder contains mainly a cubic crystal structure and the average grain size is 0.04 to 0.15 μm.

The average particle size of a calcined powder was obtained as follows. Calcined particles are scattered on the sample stage of a scanning electron microscope and photograph of the particles are taken. Then a circle which includes 50 to 100 particles is drawn on the photograph and the crystal particles on or within the circle are picked up. Profiles of the particles shown in the photograph are then image-processed to measure an area of each particle, a diameter of each particle is calculated with an assumption that each particle has a shape of circle with the same area and the average particle size is calculated as a mean value thereof.

Next, $Y_2O_3$ powder and MgO powder are mixed with the calcined powder such that the amount of the $Y_2O_3$ powder is 2.2 to 15 parts by mass and the amount of the MgO powder is 0.065 to 0.35 parts by mass with respect to 100 parts by mass of the calcined powder. In this manner, crystal phase in the dielectric ceramic formed after sintering can have mainly cubic system because a calcined powder of barium titanate as a main component was prepared with $Y_2O_3$ and MgO added thereto.

In addition, addition of $Y_2O_3$ powder and MgO powder to the abovementioned calcined powder allows to reduce grain growth of crystal grains, thereby keeping an average grain size of the crystal grains in a range of 0.05 to 0.2 μm.

For producing the multilayer ceramic capacitor in the present embodiments, a glass powder may be added as a sintering aid as long as desired dielectric characteristics can be maintained. Its content is 0.5 to 4 parts by mass with respect to 100 parts by mass of total amounts of the dielectric powder obtained by addition of $Y_2O_3$ powder and $MnCO_3$ powder to a calcined powder which is obtained by adding $Y_2O_3$ and MgO powders to barium titanate as a main component.

Next, internal electrode patterns each having a rectangle shape are formed by printing on main surfaces of the obtained ceramic green sheets. A conductor paste to form the internal electrode patterns is prepared by mixing Ni or an alloy powder of Ni as a main metal component and a ceramic powder as coexisting component, and adding an organic binder, a solvent, and a dispersing agent to the resultant mixture. The coexisting component can be a dielectric powder comprising the above-mentioned calcined powder with a $Y_2O_3$ powder and a MgO powder added thereto.

By mixing the above-described dielectric powder as a coexisting component with the conductive paste, the same dielectric ceramic as the dielectric layer 5 become a dielectric bonding member 8 having a columnar shape to penetrate the internal electrode layer 7.

Next, a quasi-green-laminate of the ceramic green sheets is formed by stacking a desired number of the ceramic green sheets on which the internal electrode patterns are formed and further stacking a plurality of ceramic green sheets, on which the internal electrode patterns are not formed, on the top and the bottom of the resultant stack such that the number of the ceramic green sheets on which the internal electrode patterns are not formed on the top is the same as that on the bottom. The internal electrode patterns in the quasi-green-laminate are staggered by a distance corresponding to a half pattern in the longitudinal direction. Such a stacking manner will provide a laminate having the internal electrode patterns exposed alternately on the end surfaces of the laminate after being cut.

In the present invention, instead of the method of forming the internal electrode patterns first on the main surfaces of the ceramic green sheets and then stacking the ceramic green sheets, a multilayer ceramic capacitor can also be formed by a method described below. A ceramic green sheet is brought into contact with a lower base, the internal electrode pattern is subsequently printed thereon and is dried, and the ceramic green sheet on which no internal electrode pattern is printed is subsequently placed on the thus-printed-and-dried internal electrode pattern to temporarily be brought into contact with the internal electrode pattern.

Next, the quasi-green-laminate is pressed under conditions at higher temperature and at higher pressure than the temperature and the pressure in the stacking described above. As a result, a laminate is formed in which the ceramic green sheets and the internal electrode patterns are strongly bonded to each other.

The laminate is then cut in a grid and a capacitor compact body is formed such that ends of internal electrode patterns are exposed.

The capacitor compact body is subsequently fired in a certain atmosphere and under a certain temperature condition to form a capacitor body 1. The capacitor body 1 may be chamfered for the edge line portions and may also be subjected to barrel polishing to expose the internal electrode layers 7 at opposite end surfaces of the capacitor body 1 in some cases.

A maximum temperature of the firing temperature is 1100° C. to 1350° C. and the holding time is 1 to 3 hours. A firing atmosphere is hydrogen-nitrogen. As a result of sintering in such a condition, an average size of crystal grains constituting the dielectric layers 5 can be in a range between 0.05 and 2 μm and the capacitor body 1 which comprises the dielectric bonding member 8 in the internal electrode layers 7 can be obtained. Then, a re-oxidation treatment is performed at a temperature in a range of 900° C. to 1100° C. if necessary.

An external electrode paste is then applied to the opposite ends of the capacitor body 1 and is baked to form the external electrodes 3. To enhance the implementation property, a plated film is formed on the surfaces of the external electrodes 3 in some cases.

Hereinafter, the present invention is described in further detail with reference to examples. However, the present invention is not limited to the following examples.

EXAMPLE

First, $BaCO_3$ powder, $TiO_2$ powder, $Y_2O_3$ powder and $MnCO_3$ powder, each having a purity of 99.9%, were provided, and these were blended at ratios shown in Table 1 and Table 2 so that mixed powders were prepared. The amounts shown in the Table 1 are equivalent to the amounts of oxides of the abovementioned element.

Then, the mixed powder was calcined at 1000° C., and the resultant calcined powder was pulverized. Average particle size of the resultant calcined powder was 0.1 μm. Note that the average particle size of the pulverized powder was measured by the following processes: the particles of the pulverized powder was scattered on the sample stage of a scanning electron microscope; photograph of the particles were taken; then a circle which includes 50 to 100 particles was drawn on the photograph; the powders on or within the circle were picked up; profiles of the particles on the photograph were image-processed; the diameter of each particle was measured with an assumption that each particle has a shape of circle with the same area; and the average particle size of the pulverized powder was calculated as a mean value thereof.

Thereafter, $Yb_2O_3$ powder and MgO powder each having a purity of 99.9% were mixed with 100 parts by weight of the pulverized powder at a ratio shown in Table 1 and Table 2 to obtain a dielectric powder. In addition, glass powder comprising $SiO_2$ as a main component (40 to 60 mole % of $SiO_2$, 10 to 30 mole % of $BaO_3$, 10 to 30 mol % of CaO and 5 to 15 mol % of $LiO_2$) was added to thus obtained dielectric powder. The content of the glass powder was 3 parts by mass with respect to 100 parts by weight of the dielectric powder.

The mixed powder of the dielectric powder and the glass powder was fed into a mixture solvent of toluene and alcohol, and subjected to wet-mixture with zirconia balls having a diameter of 1 mm. Ceramic green sheets having a thickness of 13 μm were prepared by doctor blade method.

Next, internal electrode patterns each having a rectangular shape was formed on some of the ceramic green sheets. The conductive paste for forming the internal electrode patterns contains a ceramic powder, which is shown in Table 1, with average particle diameter of 0.3 μm. The amount of the ceramic powder is 15 parts by mass with respect to 100 parts by mass of the metal powder used for the conductive paste.

Then, the 100 ceramic green sheets with the internal electrode patterns printed thereon were stacked and 20 green sheets with no internal electrode patterns printed thereon were stacked and placed on upper and bottom surfaces of the stack. These are pressed by a press machine under a condition of a temperature of 60° C., a pressure of $10^7$ Pa and a time of 10 minutes to make a laminate. The resultant laminate was cut into pieces with a predetermined size to form a capacitor body compact.

Next, after a process of dewaxing in air, the capacitor body compact was sintered at 1220-1300° C. in a mixture gas of hydrogen and nitrogen. The sintered capacitor body was then subjected to re-oxidation process at a temperature of 1000° C. in nitrogen for four hours. The capacitor body has a size of 3.1 mm×1.5 mm×1.5 mm, a dielectric layer has a thickness of 10 μm and effective area of an internal electrode layer was 1.2 $mm^2$. Note that the effective area refers to an area of a portion which overlaps neighboring internal electrode layers which were alternately formed in a direction of lamination such that the internal electrode layers are alternately exposed at the different side surfaces of the capacitor body.

Then, the fired capacitor bodies were then subjected to barrel polishing. Thereafter, an external electrode paste containing a Cu powder and glass was applied to the both ends of the capacitor bodies 1 and baked at 850° C. to form external electrodes. Ni and subsequently Sn were plated on the surfaces of the external electrodes with an electrolysis barrel apparatus. Thus, multilayer ceramic capacitors were prepared.

These multilayer ceramic capacitors were evaluated as follows. Number of samples for each evaluation of a relative dielectric constant, an absolute value of a temperature coefficient of relative dielectric constant and a polarization charge is 10 and are obtained from average values thereof. Number of sample for each evaluation of X-ray diffraction and an average grain size of crystal grains is one. The relative dielectric constant at a room temperature (25° C.) was determined by measuring an capacitance under a condition of a temperature of 25° C., a frequency of 1.0 kHz and a measurement voltage of 1 Vrms with LCR meter (made by Huelet Packard co.) with using a thickness of the dielectric layer and an effective area of the internal electrode layer. The absolute value of the temperature coefficient of relative dielectric constant was determined by measuring capacitances in a temperature range of 25 to 125° C. with using an equation of $((\in 125 - \in 25)/\in 25(125-25))$.

An electrically induced strain of the obtained dielectric ceramic was determined by measuring the dielectric polarization. In this case, the polarization charges are evaluated by charge quantity (residual polarization) measured at 0V when the voltage varies between −1250V and 1250V.

The obtained dielectric ceramic was pulverized and subjected to X-ray diffraction (2θ=97 to 104°, Cu—Kα) to identify a crystal phase therein.

The average grain size of crystal grains constituting the dielectric layers were determined by the following processes: a cross-sectional fracture surface of a sample made of the fired capacitor body is polished; photograph of an internal microstructure of the polished sample is taken with using a scanning electron microscope; a circle which includes 50 to 100 particles therein was drawn on the photograph; the crystal grains on or within the circle were picked up; profiles of the particles on the photograph are subject to an image processing to measure an area of each grains; a diameter of each grain was calculated with an assumption that each grain has a shape of circle; and the average grain size was calculated as a mean value thereof.

Components of the dielectric bonding member which penetrates the internal electrode layers was analyzed by a transmission electron microscope equipped with an elemental analysis device. First, a cross section of the capacitor body constituting the multilayer ceramic capacitor was polished obliquely. Then, crystal grains, which penetrate the internal electrode layer on the polished surface, of the dielectric bonding member were subject to an element analysis by irradiating an electron beam thereto. In this case, the spot size of electron beams was 3 nm and the point for analysis is a center area of the grain. The analysis was conducted at ten dielectric bonding members which penetrate the internal electrode layers. Elements are detected from each point. Note that an element containing 0.2% or more with respect to 100% of total amounts of all measured elements in the measured data was defined as existing, while the element containing less than that was considered not existing. Barium and titanium were confirmed to be included in the measured dielectric bonding members. In Table 3 and Table 4, if an element other than barium and titanium was detected, "○" represents that the element exists and if not, "×" represents that the element does not exists.

A thermal shock characteristic is evaluated by dipping each samples in a soldering bath melted at 325° C. from a room temperature of 25° C. for one second. Appearances of the dipped multilayer ceramic capacitors were then observed by a stereoscopic microscope with a magnitude of forty times to observe the occurrence status of delamination and cracks. A ratio of a number of samples, in which the delamination and the crack occurred, to a number of all samples was obtained. The number of all samples was 100.

The compositions of the samples which were obtained sintered bodies were analyzed by Inductively Coupled Plasma (ICP) analysis and atomic absorption spectroscopy. In this case, a mixture of each resultant dielectric ceramic, boric acid and sodium carbonate was melted and dissolved in hydrochloric acid, and the resultant solution was qualitatively analyzed by atomic absorption spectroscopy for elements contained in the dielectric ceramic. Then, the identified elements were quantified by ICP analysis with standard samples obtained by diluting standard solutions of the elements. The amounts of oxygen were calculated with the assumption that the elements had valences shown in the periodic table.

Table 1 and Table 2 show mixing compositions and sintering conditions. Table 3 and 4 show compositions of the sintered bodies on an oxide basis, average grain sizes of crystal grains and compositions of the dielectric bonding members. Table 5 and 6 show properties (dielectric constants, absolute values of the temperature coefficient of relative dielectric constant, polarization charges and thermal shock property) after sintering.

TABLE 1

| | | amount with respect to 1 mole of Ba | | | amount with respect to 100 parts by mass of calcined powder | | coexisting component added to conductive | calcination | sintering |
|---|---|---|---|---|---|---|---|---|---|
| Sample No. | $YO_{3/2}$ mole | $MnCO_3$ mole | $TiO_2$ mole | MgO mole | $Yb_2O_3$ parts by mass | MgO parts by mass | paste # — | temperature ° C. | temperature ° C. |
| * 1 | 0.01 | 0.03 | 0.99 | 0 | 2.0 | 0.17 | dielectric powder | 1000 | 1250 |
| 2 | 0.01 | 0.03 | 0.99 | 0 | 2.2 | 0.17 | dielectric powder | 1000 | 1250 |
| 3 | 0.01 | 0.03 | 0.99 | 0 | 2.5 | 0.17 | dielectric powder | 1000 | 1250 |
| 4 | 0.01 | 0.03 | 0.99 | 0 | 3.0 | 0.17 | dielectric powder | 1000 | 1250 |
| 5 | 0.01 | 0.03 | 0.99 | 0 | 4.0 | 0.17 | dielectric powder | 1000 | 1250 |
| 6 | 0.01 | 0.03 | 0.99 | 0 | 6.0 | 0.17 | dielectric powder | 1000 | 1250 |
| 7 | 0.01 | 0.03 | 0.99 | 0 | 8.0 | 0.17 | dielectric powder | 1000 | 1250 |
| 8 | 0.01 | 0.03 | 0.99 | 0 | 10.0 | 0.17 | dielectric powder | 1000 | 1250 |
| 9 | 0.01 | 0.03 | 0.99 | 0 | 12.0 | 0.17 | dielectric powder | 1000 | 1250 |
| 10 | 0.01 | 0.03 | 0.99 | 0 | 15.0 | 0.17 | dielectric powder | 1000 | 1250 |
| * 11 | 0.01 | 0.03 | 0.99 | 0 | 20.0 | 0.17 | dielectric powder | 1000 | 1250 |
| * 12 | 0.0004 | 0.03 | 0.99 | 0 | 8.0 | 0.17 | dielectric powder | 1000 | 1250 |
| 13 | 0.0014 | 0.03 | 0.99 | 0 | 8.0 | 0.17 | dielectric powder | 1000 | 1250 |
| 14 | 0.005 | 0.03 | 0.99 | 0 | 8.0 | 0.17 | dielectric powder | 1000 | 1250 |
| 15 | 0.014 | 0.03 | 0.99 | 0 | 8.0 | 0.17 | dielectric powder | 1000 | 1250 |
| 16 | 0.024 | 0.03 | 0.99 | 0 | 8.0 | 0.17 | dielectric powder | 1000 | 1250 |
| 17 | 0.03 | 0.03 | 0.99 | 0 | 8.0 | 0.17 | dielectric powder | 1000 | 1250 |
| * 18 | 0.06 | 0.03 | 0.99 | 0 | 8.0 | 0.17 | dielectric powder | 1000 | 1250 |
| * 19 | 0.01 | 0 | 0.99 | 0 | 8.0 | 0.17 | dielectric powder | 1000 | 1250 |
| 20 | 0.01 | 0.0002 | 0.99 | 0 | 8.0 | 0.17 | dielectric powder | 1000 | 1250 |
| 21 | 0.01 | 0.02 | 0.99 | 0 | 8.0 | 0.17 | dielectric powder | 1000 | 1250 |
| 22 | 0.01 | 0.04 | 0.99 | 0 | 8.0 | 0.17 | dielectric powder | 1000 | 1250 |
| 23 | 0.01 | 0.045 | 0.99 | 0 | 8.0 | 0.17 | dielectric powder | 1000 | 1250 |

* indicates samples which do not fall within the scope of the present invention.
; dielectric powder: powder used for ceramic green sheet (including $Yb_2O_3$ and MgO)

TABLE 2

| Sample No. | amount with respect to 1 mole of Ba | | | | amount with respect to 100 parts by mass of calcined powder | | coexisting component added to conductive paste # | calcination temperature °C. | sintering temperature °C. |
|---|---|---|---|---|---|---|---|---|---|
| | YO$_{3/2}$ mole | MnCO$_3$ mole | TiO$_2$ mole | MgO mole | Yb$_2$O$_3$ parts by mass | MgO parts by mass | | | |
| * 24 | 0.01 | 0.05 | 0.99 | 0 | 8.0 | 0.17 | dielectric powder | 1000 | 1250 |
| 25 | 0.01 | 0.03 | 0.98 | 0 | 8.0 | 0.17 | dielectric powder | 1000 | 1250 |
| * 26 | 0.01 | 0.03 | 0.99 | 0 | 8.0 | 0.06 | dielectric powder | 1000 | 1250 |
| 27 | 0.01 | 0.03 | 0.99 | 0 | 8.0 | 0.065 | dielectric powder | 1000 | 1250 |
| 28 | 0.01 | 0.03 | 0.99 | 0 | 8.0 | 0.13 | dielectric powder | 1000 | 1250 |
| 29 | 0.01 | 0.03 | 0.99 | 0 | 8.0 | 0.15 | dielectric powder | 1000 | 1250 |
| 30 | 0.01 | 0.03 | 0.99 | 0 | 8.0 | 0.26 | dielectric powder | 1000 | 1250 |
| 31 | 0.01 | 0.03 | 0.99 | 0 | 8.0 | 0.34 | dielectric powder | 1000 | 1250 |
| * 32 | 0.01 | 0.03 | 0.99 | 0 | 8.0 | 0.38 | dielectric powder | 1000 | 1250 |
| * 33 | 0.01 | 0.03 | 0.99 | 0 | 8.0 | 0.17 | dielectric powder | 1000 | 1220 |
| 34 | 0.01 | 0.03 | 0.99 | 0 | 8.0 | 0.17 | dielectric powder | 1000 | 1270 |
| * 35 | 0.01 | 0.03 | 0.99 | 0 | 8.0 | 0.17 | dielectric powder | 1000 | 1300 |
| 36 | 0.01 | 0.03 | 0.99 | 0 | 8.0 | 0.17 | dielectric powder | 950 | 1250 |
| 37 | 0.01 | 0.03 | 0.99 | 0 | 8.0 | 0.17 | dielectric powder | 1030 | 1250 |
| 38 | 0.01 | 0.03 | 0.99 | 0 | 8.0 | 0.17 | dielectric powder | 1050 | 1250 |
| * 39 | 0.01 | 0.03 | 0.99 | 0 | 8.0 | 0.17 | calcined powder | 1000 | 1250 |
| * 40 | 0.01 | 0.03 | 0.99 | 0 | 8.0 | 0.17 | BT powder | 1000 | 1250 |
| * 41 | 0.01 | 0.03 | 0.99 | 0 | 8.0 | 0.17 | N/A | 1000 | 1250 |

* indicates samples which do not fall within the scope of the present invention.
; BT powder: barium titanate powder
calcined powder: calcined powder used for ceramic green sheet (not including Yb$_2$O$_3$ and MgO)
dielectric powder: powder used for ceramic green sheet (including Yb$_2$O$_3$ and MgO)

TABLE 3

| Sample No. | amount with respect to 1 mole of Ba | | | | | average grain size of crystal grains μm | composition of the dielectric bonding member which penetrates the internal electrode layer | | | |
|---|---|---|---|---|---|---|---|---|---|---|
| | YO$_{3/2}$ mole | MnO mole | YO$_{3/2}$ mole | MgO mole | YbO$_{3/2}$ mole | | Y | Mn | Mg | Yb |
| * 1 | 0.010 | 0.030 | 0.99 | 0.020 | 0.020 | 0.3 | ○ | ○ | ○ | ○ |
| 2 | 0.010 | 0.030 | 0.99 | 0.020 | 0.026 | 0.18 | ○ | ○ | ○ | ○ |
| 3 | 0.010 | 0.030 | 0.99 | 0.020 | 0.030 | 0.17 | ○ | ○ | ○ | ○ |
| 4 | 0.010 | 0.030 | 0.99 | 0.020 | 0.036 | 0.17 | ○ | ○ | ○ | ○ |
| 5 | 0.010 | 0.030 | 0.99 | 0.020 | 0.040 | 0.17 | ○ | ○ | ○ | ○ |
| 6 | 0.010 | 0.030 | 0.99 | 0.020 | 0.060 | 0.15 | ○ | ○ | ○ | ○ |
| 7 | 0.010 | 0.030 | 0.99 | 0.020 | 0.080 | 0.12 | ○ | ○ | ○ | ○ |
| 8 | 0.010 | 0.030 | 0.99 | 0.020 | 0.110 | 0.08 | ○ | ○ | ○ | ○ |
| 9 | 0.010 | 0.030 | 0.99 | 0.020 | 0.140 | 0.08 | ○ | ○ | ○ | ○ |
| 10 | 0.010 | 0.030 | 0.99 | 0.020 | 0.180 | 0.06 | ○ | ○ | ○ | ○ |
| * 11 | 0.010 | 0.030 | 0.99 | 0.020 | 0.240 | 0.06 | ○ | ○ | ○ | ○ |
| * 12 | 0.0004 | 0.030 | 0.99 | 0.020 | 0.080 | 0.3 | ○ | ○ | ○ | ○ |
| 13 | 0.0014 | 0.030 | 0.99 | 0.020 | 0.080 | 0.15 | ○ | ○ | ○ | ○ |
| 14 | 0.005 | 0.030 | 0.99 | 0.020 | 0.080 | 0.13 | ○ | ○ | ○ | ○ |
| 15 | 0.014 | 0.030 | 0.99 | 0.020 | 0.080 | 0.12 | ○ | ○ | ○ | ○ |
| 16 | 0.024 | 0.030 | 0.99 | 0.020 | 0.080 | 0.1 | ○ | ○ | ○ | ○ |
| 17 | 0.030 | 0.030 | 0.99 | 0.020 | 0.080 | 0.06 | ○ | ○ | ○ | ○ |
| * 18 | 0.060 | 0.030 | 0.99 | 0.020 | 0.080 | 0.04 | ○ | ○ | ○ | ○ |
| * 19 | 0.010 | 0 | 0.99 | 0.020 | 0.080 | 0.1 | ○ | ○ | ○ | ○ |
| 20 | 0.010 | 0.0002 | 0.99 | 0.020 | 0.080 | 0.09 | ○ | ○ | ○ | ○ |
| 21 | 0.010 | 0.020 | 0.99 | 0.020 | 0.080 | 0.08 | ○ | ○ | ○ | ○ |
| 22 | 0.010 | 0.040 | 0.99 | 0.020 | 0.080 | 0.07 | ○ | ○ | ○ | ○ |
| 23 | 0.010 | 0.045 | 0.99 | 0.020 | 0.080 | 0.06 | ○ | ○ | ○ | ○ |

* indicates samples which do not fall within the scope of the present invention.

TABLE 4

| Sample No. | amount with respect to 1 mole of Ba | | | | | average grain size of crystal grains μm | composition of the dielectric bonding member which penetrates the internal electrode layer | | | |
|---|---|---|---|---|---|---|---|---|---|---|
| | YO$_{3/2}$ mole | MnO mole | YO$_{3/2}$ mole | MgO mole | YbO$_{3/2}$ mole | | Y | Mn | Mg | Yb |
| * 24 | 0.010 | 0.050 | 0.99 | 0.020 | 0.080 | 0.05 | ○ | ○ | ○ | ○ |
| 25 | 0.010 | 0.030 | 0.98 | 0.020 | 0.080 | 0.09 | ○ | ○ | ○ | ○ |
| * 26 | 0.010 | 0.030 | 0.99 | 0.005 | 0.080 | 0.11 | ○ | ○ | ○ | ○ |

TABLE 4-continued

| | amount with respect to 1 mole of Ba | | | | | average grain size of crystal grains | composition of the dielectric bonding member which penetrates the internal electrode layer | | | |
|---|---|---|---|---|---|---|---|---|---|---|
| Sample No. | $YO_{3/2}$ mole | MnO mole | $YO_{3/2}$ mole | MgO mole | $YbO_{3/2}$ mole | μm | Y | Mn | Mg | Yb |
| 27 | 0.010 | 0.030 | 0.99 | 0.008 | 0.080 | 0.15 | ○ | ○ | ○ | ○ |
| 28 | 0.010 | 0.030 | 0.99 | 0.015 | 0.080 | 0.15 | ○ | ○ | ○ | ○ |
| 29 | 0.010 | 0.030 | 0.99 | 0.017 | 0.080 | 0.12 | ○ | ○ | ○ | ○ |
| 30 | 0.010 | 0.030 | 0.99 | 0.030 | 0.080 | 0.08 | ○ | ○ | ○ | ○ |
| 31 | 0.010 | 0.030 | 0.99 | 0.040 | 0.080 | 0.08 | ○ | ○ | ○ | ○ |
| * 32 | 0.010 | 0.030 | 0.99 | 0.045 | 0.080 | 0.08 | ○ | ○ | ○ | ○ |
| * 33 | 0.010 | 0.030 | 0.99 | 0.020 | 0.080 | 0.04 | ○ | ○ | ○ | ○ |
| 34 | 0.010 | 0.030 | 0.99 | 0.020 | 0.080 | 0.2 | ○ | ○ | ○ | ○ |
| * 35 | 0.010 | 0.030 | 0.99 | 0.020 | 0.080 | 0.22 | ○ | ○ | ○ | ○ |
| 36 | 0.010 | 0.030 | 0.99 | 0.020 | 0.080 | 0.11 | ○ | ○ | ○ | ○ |
| 37 | 0.010 | 0.030 | 0.99 | 0.020 | 0.080 | 0.13 | ○ | ○ | ○ | ○ |
| 38 | 0.010 | 0.030 | 0.99 | 0.020 | 0.080 | 0.15 | ○ | ○ | ○ | ○ |
| * 39 | 0.010 | 0.030 | 0.99 | 0.020 | 0.080 | 0.12 | ○ | ○ | ○ | X |
| * 40 | 0.010 | 0.030 | 0.99 | 0.020 | 0.080 | 0.12 | X | ○ | ○ | X |
| * 41 | 0.010 | 0.030 | 0.99 | 0.020 | 0.080 | 0.12 | X | ○ | ○ | X |

* indicates samples which do not fall within the scope of the present invention.

TABLE 5

| | relative dielectric constant ($\epsilon_r$) | | absolute value of temperature coefficient of relative dielectric constant | polarization | thermal shock |
|---|---|---|---|---|---|
| Sample No. | 25° C. mole | 125° C. mole | 25-125° C. $\times 10^{-6}/°$ C. | charge $nC/cm^2$ | resistant test # count/100 |
| * 1 | 1700 | 1400 | 1765 | 38 | 0 |
| 2 | 877 | 792 | 969 | 26 | 0 |
| 3 | 872 | 790 | 940 | 26 | 0 |
| 4 | 870 | 789 | 931 | 25 | 0 |
| 5 | 860 | 780 | 930 | 25 | 0 |
| 6 | 830 | 760 | 843 | 18 | 0 |
| 7 | 800 | 740 | 750 | 16 | 0 |
| 8 | 770 | 720 | 649 | 16 | 0 |
| 9 | 750 | 710 | 533 | 16 | 0 |
| 10 | 710 | 677 | 465 | 16 | 0 |
| * 11 | 400 | 382 | 450 | 16 | 0 |
| * 12 | 900 | 803 | 1078 | 28 | 0 |
| 13 | 880 | 801 | 898 | 25 | 0 |
| 14 | 835 | 770 | 778 | 20 | 0 |
| 15 | 790 | 730 | 759 | 17 | 0 |
| 16 | 760 | 710 | 657 | 17 | 0 |
| 17 | 700 | 659 | 586 | 16 | 0 |
| * 18 | 610 | 551 | 967 | 25 | 0 |
| * 19 | 880 | 790 | 1023 | 27 | 0 |
| 20 | 830 | 749 | 976 | 25 | 0 |
| 21 | 815 | 750 | 798 | 20 | 0 |
| 22 | 770 | 715 | 714 | 17 | 0 |
| 23 | 720 | 670 | 694 | 17 | 0 |

* indicates samples which do not fall within the scope of the present invention.
; temperature for the thermal shock resistant test: 300° C.

TABLE 6

| | relative dielectric constant ($\epsilon_r$) | | absolute value of temperature coefficient of relative dielectric constant | polarization | thermal shock |
|---|---|---|---|---|---|
| Sample No. | 25° C. mole | 125° C. mole | 25-125° C. $\times 10^{-6}/°$ C. | charge $nC/cm^2$ | resistant test # sample(s)/100 samples |
| * 24 | 620 | 557 | 1016 | 17 | 0 |
| 25 | 780 | 720 | 769 | 19 | 0 |
| * 26 | 950 | 830 | 1260 | 28 | 0 |
| 27 | 870 | 790 | 919 | 25 | 0 |
| 28 | 830 | 760 | 843 | 23 | 0 |

TABLE 6-continued

| Sample No. | relative dielectric constant ($\epsilon_r$) | | absolute value of temperature coefficient of relative dielectric constant | polarization | thermal shock |
|---|---|---|---|---|---|
| | 25° C. mole | 125° C. mole | 25-125° C. ×$10^{-6}$/° C. | charge nC/cm$^2$ | resistant test # sample(s)/100 samples |
| 29 | 800 | 734 | 825 | 18 | 0 |
| 30 | 770 | 715 | 714 | 17 | 0 |
| 31 | 700 | 655 | 714 | 17 | 0 |
| * 32 | 640 | 580 | 938 | 26 | 0 |
| * 33 | 550 | 510 | 727 | 16 | 0 |
| 34 | 860 | 790 | 814 | 22 | 0 |
| * 35 | 1030 | 930 | 971 | 31 | 0 |
| 36 | 790 | 730 | 759 | 17 | 0 |
| 37 | 830 | 765 | 783 | 18 | 0 |
| 38 | 850 | 780 | 824 | 20 | 0 |
| * 39 | 805 | 710 | 1180 | 27 | 0 |
| * 40 | 808 | 706 | 1262 | 28 | 0 |
| * 41 | 800 | 740 | 750 | 16 | 18 |

* indicates samples which do not fall within the scope of the present invention.
; temperature for the thermal shock resistant test: 300° C.

As is understood from the Tables 1 to 4, in samples Nos. 2 to 10, 13 to 17, 20 to 23, 25, 27 to 31, 34 and 36 to 38 which are within the scope of the present invention of the multilayer ceramic capacitor, the relative dielectric constant at 25° C. is 700 or more, the relative dielectric constant at 125° C. is 650 or more, the temperature coefficient of relative dielectric constant in a temperature range from 25° C. to 125° C. is 1000× $10^{-6}$/° C. or less as the absolute value, polarization charges (values of residual polarization at 0V of voltage) are 25 nC/cm$^2$ or less, and neither cracks nor delamination was found in a thermal shock test.

In addition, samples Nos. 6 to 9, 14 to 16, 21, 22, 25, 29, 30 and 36 to 38 included, with respect to one mole of Ba, yttrium equivalent to 0.005 to 0.024 mole of YO$_{3/2}$, manganese equivalent to 0.02 to 0.04 mole of MnO, magnesium equivalent to 0.017 to 0.03 mole of MgO and ytterbium equivalent to 0.06 to 0.14 mole of YbO$_{3/2}$ and had an average grain size of crystal grains of 0.07 to 1.5 μm. In these samples, the relative dielectric constant at 25° C. is 750 or more, the relative dielectric constant at 125° C. is 710 or more, the temperature coefficient of relative dielectric constant in a temperature range from 25° C. to 125° C. is 843×$10^{-6}$/° C. or less as the absolute value, polarization charges (values of residual polarization at 0V of voltage) are 20 nC/cm$^2$ or less, and neither cracks nor delamination was found in a thermal shock test.

In contrast, in samples Nos. 1, 11, 12, 18, 19, 24, 26, 32, 33, 35 and 39 to 41 which are out of scope of the present invention, at least one of characteristics from the relative dielectric constant at 25° C. is 700 or more, the relative dielectric constant at 125° C. of 650 or more, the temperature coefficient of relative dielectric constant in a temperature range from 25° C. to 125° C. of 1000×$10^{-6}$/° C. or less as the absolute value, polarization charges (values of residual polarization at 0V of voltage) of 25 nC/cm$^2$ or less, and no defective results of the thermal shock resistance test with the temperature difference of 300° C. are unsatisfied.

The invention claimed is:

1. A multilayer ceramic capacitor, comprising:
   a capacitor body in which dielectric layers and internal electrode layers are alternately layered; and
   an external electrode formed on an end surface of the capacitor body where the internal electrodes are exposed, wherein
   two dielectric layers of the dielectric layers sandwiching one of the internal electrode layers and disposed on both side of the internal electrode layer is formed together with a dielectric bonding member which is arranged such that the dielectric bonding member penetrates part of the internal electrode layer,
   the dielectric layers are made of a dielectric ceramic which comprises a main crystal phase containing barium titanate as a main crystal component, having a crystal structure mainly comprising a cubic system, having an average grain size of crystal grains constituting the crystal phase in a range of 0.05 to 0.2 μm, and made of a dielectric ceramic comprising ytterium, manganese, magnesium and ytterbium,
   the dielectric bonding member is made of a dielectric ceramic which contain the same component as the main crystal phase of the dielectric ceramic constituting the dielectric layers, and
   with respect to one mole of barium, elements calculated by melting and dissolving the multilayer ceramic capacitor in acid are:
   yttrium equivalent to 0.0014 to 0.03 mole of YO$_{3/2}$;
   manganese equivalent to 0.0002 to 0.045 mole of MnO;
   magnesium equivalent to 0.0075 to 0.04 mole of MgO; and
   ytterbium equivalent to 0.025 to 0.18 mole of YbO$_{3/2}$.

2. The dielectric ceramic according to claim 1, wherein, with respect to one mole of barium:
   yttrium is equivalent to 0.005 to 0.024 mole of YO$_{3/2}$;
   manganese is equivalent to 0.02 to 0.04 mole of MnO;
   magnesium is equivalent to 0.017 to 0.03 mole of MgO; and
   ytterbium is equivalent to 0.06 to 0.14 mole of YbO$_{3/2}$, and the average grain size of the crystal grains is in a range of 0.07 μm to 0.15 μm.

* * * * *